Sept. 20, 1955 W. H. KARMANN 2,718,177
MACHINE FOR UNDERCUTTING COMMUTATORS
Filed Dec. 13, 1950 4 Sheets-Sheet 1

INVENTOR.
WILLIAM H. KARMANN
BY
Edward M. Apple
ATTORNEY

Sept. 20, 1955  W. H. KARMANN  2,718,177
MACHINE FOR UNDERCUTTING COMMUTATORS
Filed Dec. 13, 1950  4 Sheets-Sheet 2

INVENTOR.
WILLIAM H. KARMANN
BY Edward M. Apple
ATTORNEY

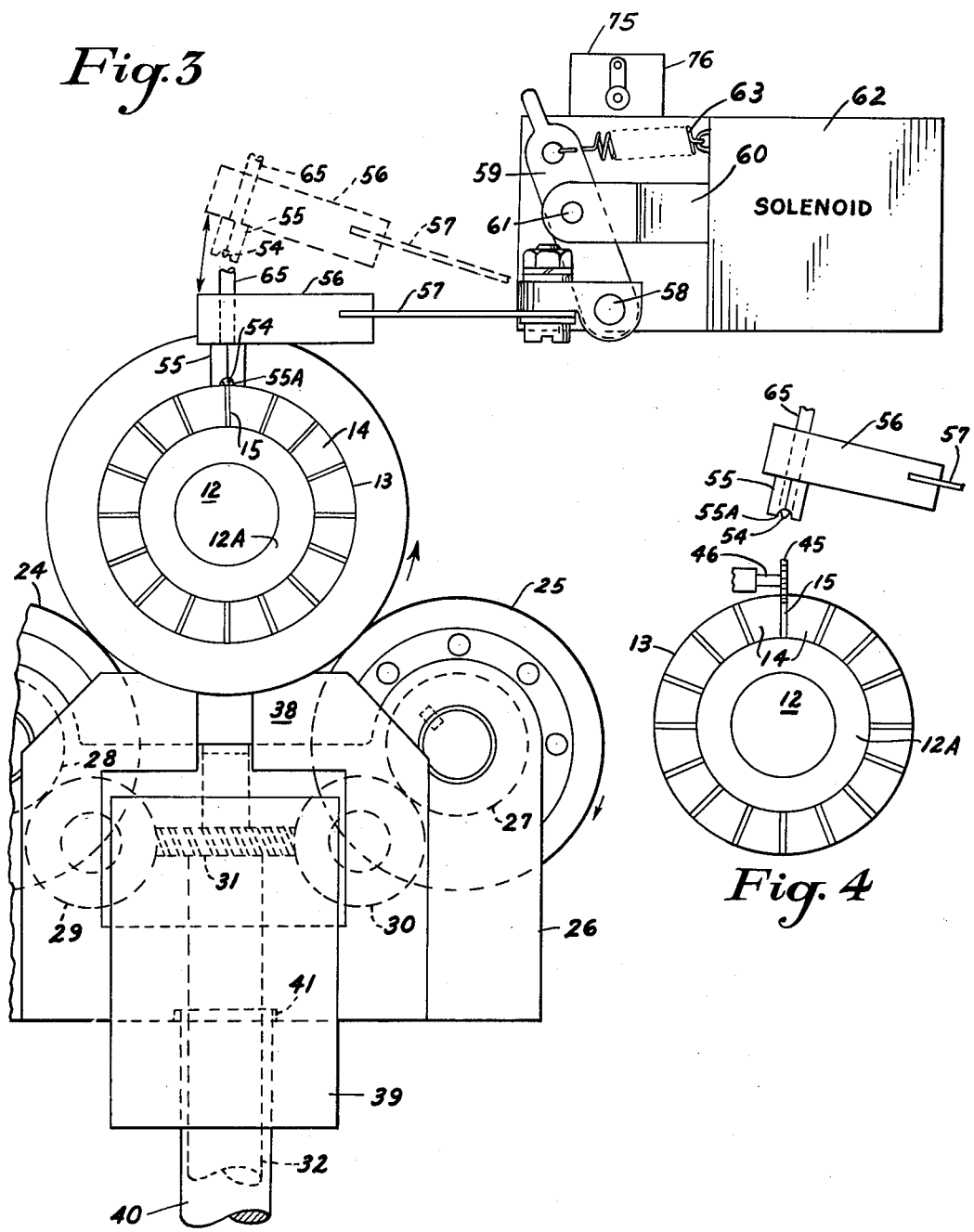

Sept. 20, 1955  W. H. KARMANN  2,718,177
MACHINE FOR UNDERCUTTING COMMUTATORS
Filed Dec. 13, 1950  4 Sheets-Sheet 4

INVENTOR.
WILLIAM H. KARMANN
BY Edward M. Apple
ATTORNEY

United States Patent Office 2,718,177
Patented Sept. 20, 1955

2,718,177
MACHINE FOR UNDERCUTTING COMMUTATORS

William H. Karmann, Dearborn, Mich.

Application December 13, 1950, Serial No. 200,579

7 Claims. (Cl. 90—15.1)

This invention relates to the manufacture of commutators and has particular reference to a machine for undercutting the mica insulation between the commutator segments.

Many methods and devices have been proposed heretofore for the purpose of undercutting commutators but the problem, up to the present time, has not been solved to the satisfaction of those skilled in the art. Particularly has the problem been difficult for motor manufacturers, who have been faced with a bottleneck in motor production because of the difficulty in performing what would normally appear to be a simple operation.

It is an object, therefore, of this iinvention to provide a machine which will automatically undercut commutators in a uniform manner and without loss resulting from damage to pieces being worked upon.

Another object of the invention is to provide a machine of the character indicated which employs a unique electric circuit and apparatus for locating and indexing the work piece.

Another object of the invention is the provision of a machine of the character indicated which is constructed and arranged so that it will positively locate and center the mica to be undercut and will automatically lock the armature against rotation during the milling or cutting operation.

Other objects and advantages of the invention will become more apparent as the description proceeds, reference being made from time to time to the accompanying drawings, forming part of the within disclosure, in which drawings:

Fig. 3 is an enlarged elevational view showing an armature, including a commutator in position on the driving wheels together with the means for driving them, and illustrating the relation of the locking magnet and indexing fingers to the armature and commutator.

Fig. 4 is an end view of the commutator shown in Fig. 3 with the indexing fingers in elevating position and showing the cutter making an undercutting stroke on one of the mica insulators.

Fig. 5 is an enlarged fragmentary view illustrating certain of the means for driving and stopping the drive wheels which rotate the armature.

Figure 1:
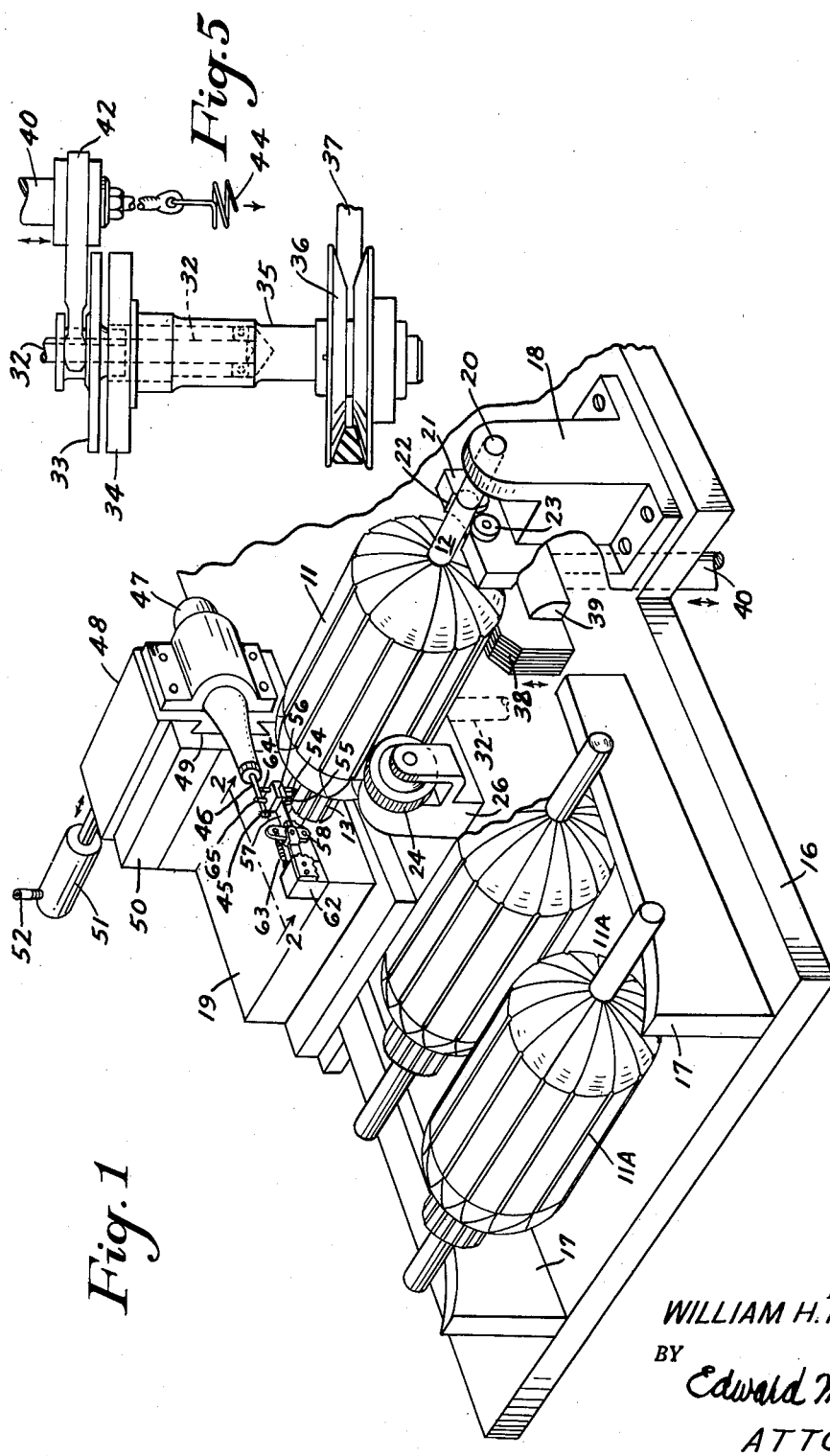
Fig. 1 is a perspective view of a device embodying the invention.

Referring now more particularly to the drawings, it will be understood that in the embodiment herein disclosed, the reference character 11 indicates a conventional motor armature or rotor having a shaft 12, a bushing 12A and a commutator 13, the latter being constructed of conductive bars or segments 14, which are insulated from one another by means of mica insulators 15 and the bushing 12A. The elements just described form no part of the invention except as combined with the structure which I will now describe, which has for its purpose the rapid and efficient undercutting of the mica insulators 15 of the commutator 13.

My undercutting machine comprises a suitable base 16 (Fig. 1) and tracks 17 which are used to feed the armatures 11A to the machine. Mounted on the base 16 are support members 18 and 19 which are adapted to support the armature 11 by resting thereon either end of the shaft 12. The support 18 has a recessed extension 20 in which one end of the armature shaft is rotatably held against displacement. The support 18 has another extension member 21 which is provided with a terminal groove 22, adapted to accommodate the intermediate portion of the shaft 12. Rollers 23 are mounted on the extension member 21 and help to rotatably support the shaft 12 and reduce its friction of rotation.

The armature 11 is rotated by means of a pair of rubber-covered drive wheels 24 and 25 (Fig. 3) which frictionally engage the outer periphery of the laminated portion of the armature 11. The drive wheels 24 and 25 are supported by the member 26 and are driven through the gear trains 27, 28, 29, 30 and 31. The gear 31 is secured to a shaft 32 which is driven by a constant speed motor, not shown, through a clutch assembly 33 and 34 and the shaft 35, the pulley 36, and the belt 37.

An electro magnet 38 having a coil 39 is mounted for vertical reciprocation in the base member 16 and when energized as hereinafter described is attracted to the iron laminated portion of the armature 11 and serves to lock the armature against rotation. A pull rod 40 (Fig. 3) is secured at one end to the bottom of the magnet 38, as at 41, and in turn has secured to its opposite end one end of a yoke member 42 (Fig. 5) which is adapted to disengage the clutch plate 33 from the clutch member 34 when the magnet 38 is energized.

Upon the disengagement of the clutch member 33 from the member 34, the rotation of the shaft 32 will cease and the drive wheels 24 and 25 in turn will be stopped. When the magnet 38 is de-energized it, together with the shaft 40 and the yoke 42, will be shifted under the influence of the spring 44, whereupon the clutch member 33 will also be shifted into engagement with the driving member 34 of the clutch assembly. This will again start the rotation of the shaft 32 which drives the friction drive wheels 24 and 25 to again slowly rotate the armature 11.

Figure 6:
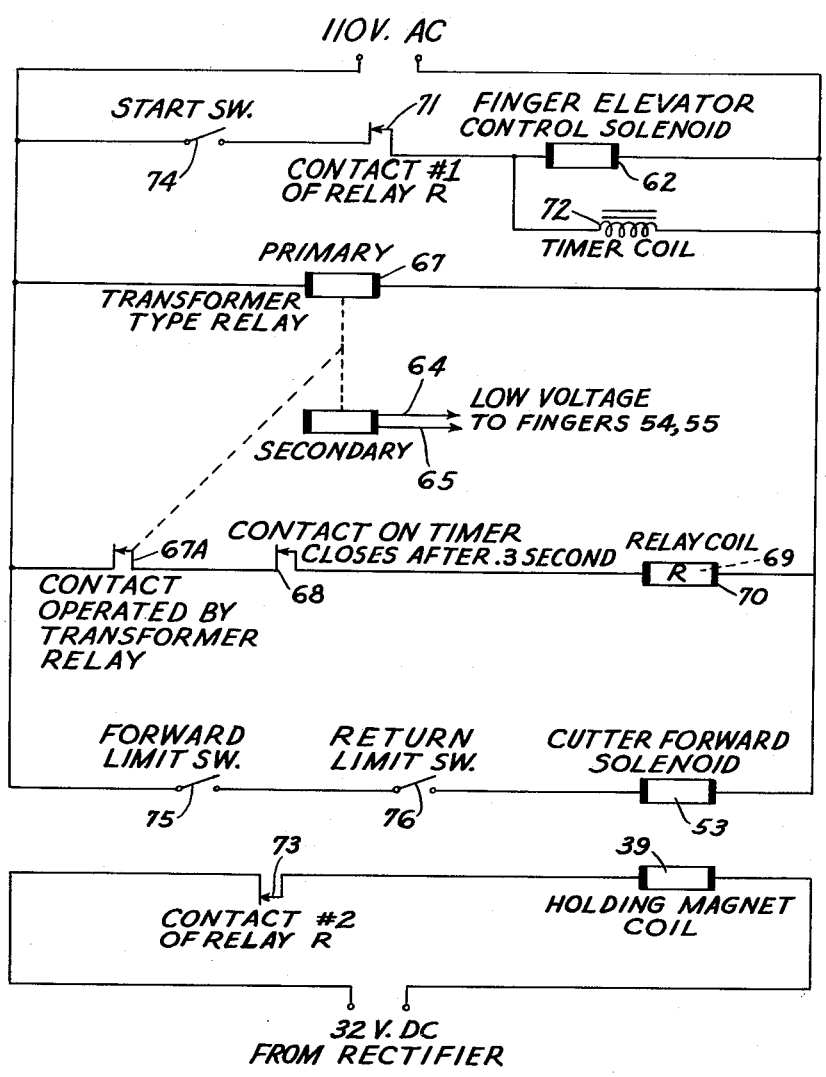
Fig. 6 is a diagrammatic view illustrating the electrical circuits employed with the machine.

It will be understood that the rotation of the armature 11 is intermittent. That is, the rotation of the armature 11 is interrupted as many times during a single revolution as there are mica insulators in the commutator, so that upon each interruption of the rotation of the armature 11, the armature will be held against rotation by the holding magnet 38 to permit the cutter 45 to be moved longitudinally along a mica insulator 15 to undercut the same. The cutter 45 is preferably a Carbide saw and is mounted on the shaft 46 of a motor 47, which is mounted at the end of a block 48 which is slidably mounted, as at 49, in the guide member 50 which is supported on the base 16. The block 48 is reciprocated by means of an air cylinder 51, which is connected to a conventional pneumatic system, as at 52, the air being controlled by a solenoid 53 which is electrically connected in the circuit as shown in Fig. 6.

The interrupting of the rotation of the armature 11 is effected electrically through an indexing or selecting mechanism which I will now describe.

A pair of electrically conductive locating fingers 54 and 55 are mounted on an insulating block 56, which in turn is secured to an arm 57 which is pivoted, as at 58 (Fig. 3). The arm 57 is secured to a rocker arm 59 which is also pivoted, as at 58. The rocker arm 59 is actuated by a member 60, to which it is pivoted, as at 61, the member 60 being actuated in one direction by the solenoid 62 which is electrically connected in the circuit as shown in Fig. 6. The arm 59 is moved in the opposite direction by means of the spring 63. In other words, the solenoid 62 serves to hold the fingers 54 and 55 in contact with the commutator and the spring 63 lifts the fingers away from the commutator 13 when the solenoid 62 is de-energized. When the fingers 54 and 55 are lifted from the commutator 13, as shown in Fig. 4, the cutter 45 will move inwardly to undercut a mica insulator 15.

The finger 54 has a knife-like edge which is less in width than the thickness of any one of the mica insulators 15, and the finger 55 is split through the center (Fig. 2) and is provided with a groove 55A which is substantially of the same width as the thickness of one of the mica insulators 15. The fingers 54 and 55 are respectively connected through the leads 64 and 65 to a low voltage circuit which is controlled by a contact 67A of a transformer type relay 67, as shown in Fig. 6. A timer, having a contact 68 and coil 72, which is preferably set for a .3 second delay before it closes, delays the operation of another relay 70. The contacts 67A and 68 control the coil 69 of the two-pole relay 70, the first contact 71 of which controls the solenoid 62 and the timer coil 72 and the second contact 73 of which controls the coil 39 of the holding magnet 38.

A starting switch 74 controls the 110-volt A. C. input and limit switches 76 nad 76 control the forward and backward movement of the cutter 45.

Figure 2:
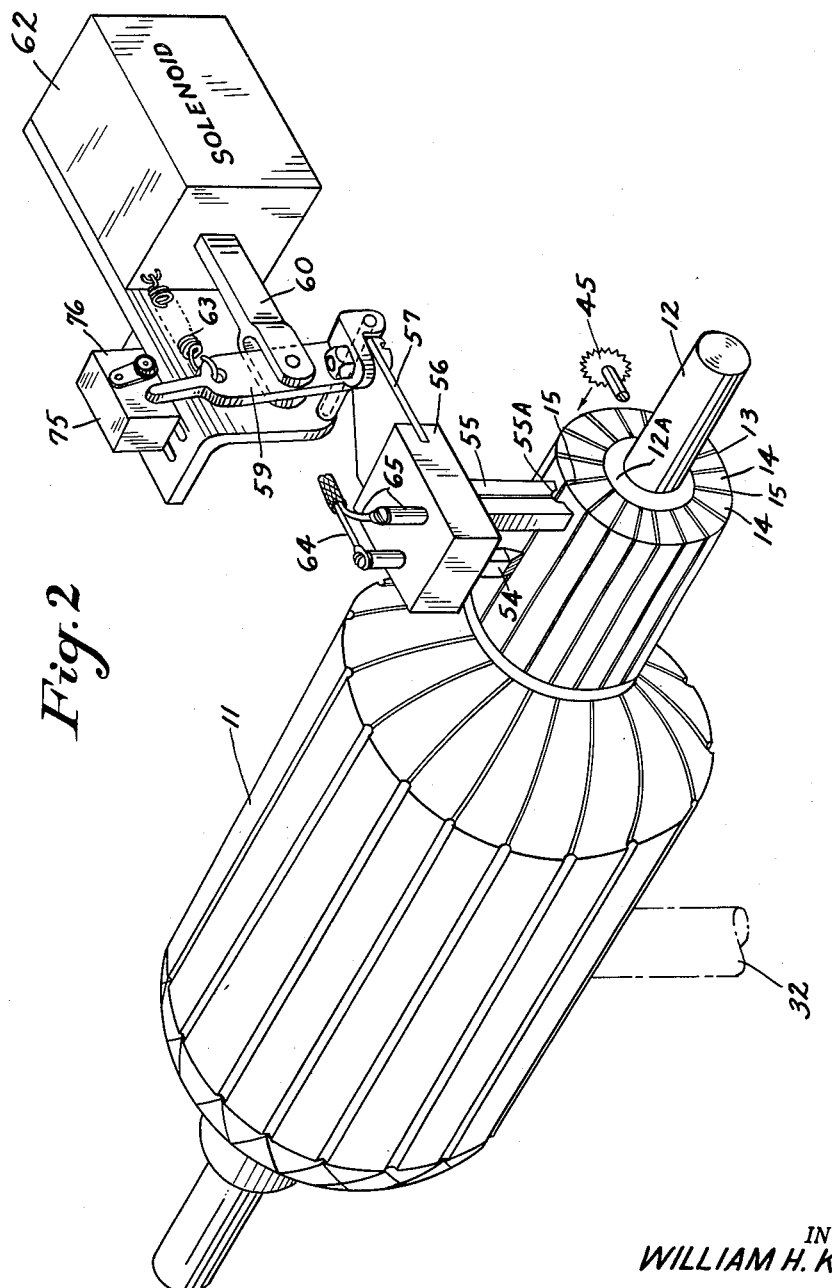
Fig. 2 is an enlarged perspective view of certain of the elements shown in Fig. 1 and taken substantially on the line 2—2 of Fig. 1.

The device works as follows: An armature 11 is first placed in the machine as shown in Figs. 1 and 2. The switch 74 is then closed energizing the solenoid 62 and the timer coil 72. This causes the fingers 54 and 55 to fall onto the commutator 13, and so long as the fingers 54 and 55 both touch a conductor bar 14 of the commutator 13, there will be a short circuit through the relay 67, which energizes it causing its contacts 67A to open. The timer after its .3 second delay now closes its contact 68. During this time, the armature 11 is being rotated by the wheels 24 and 25 and will rotate until the sharp finger 54 runs off of a conductor bar 14 onto a mica separator 15, at that instant the short circuit through the fingers 54 and 55 is removed and the contact 67A closes energizing the coil 69. This closes the contact 73 of the relay 70 and energizes the coil 39 of the holding magnet 38, which is drawn upwardly into contact with the laminated iron core of the armature 11 to hold its against rotation. The upward movement of the magnet 38 also disconnects the clutch 33 and 34 and the drive wheels 24 and 25 stop rotating.

The contact 71 of the relay 70 simultaneously opens de-energizing the timer and solenoid 62 which permits the fingers 54 and 55 to be lifted by the spring 63. As the fingers 54 and 55 rise, the limit switch 75 is closed energizing the solenoid 53, causing the cutter 45 to be moved forward on the mica 15 under the influence of the air cylinder 51. At the end of the forward stroke of the cutter 45, the limit switch 76 is actuated causing the return of the cutter 45 to its position of rest as shown in Fig. 1.

The cycle repeats until all of the mica insulators are undercut. The armature is removed and another armature is placed in position and a new cycle is started as before.

Having described my invention what I claim and desire to secure by Letters Patent is:

1. A device of the character described for undercutting the mica of a commutator secured to an armature comprising, rotatable supports for said armature, drive wheels for rotating said supports, an electromagnet for holding said armature against displacement when said drive wheels are not moving, a cutter arranged for movement over said commutator, means for actuating said drive wheels, means for energizing said magnet and means for moving said cutter, conductive fingers arranged to contact said commutator, an electric circuit connected to said fingers and arranged to be closed when said fingers contact two conductor bars on said commutator, electrical circuits arranged to actuate said means for moving the said drive wheels, said means for energizing said magnet and said means for moving said cutter, said last-named electrical circuits being controlled by at least one relay arranged to be actuated by the said first mentioned circuit.

2. The structure set forth in claim 1, in which one of said fingers is split and of such size and shape that one part thereof contacts one conductor bar of the commutator and the other part thereof contacts an adjacent bar, the other of said fingers having an edge less than the thickness of the mica insulators of said commutator and having its thin edge in a common plane with the median line of said split finger.

3. The combination defined in claim 1, including elements for moving said fingers into and out of contacting relation with said commutator.

4. The combination defined in claim 1, in which one of said fingers is split longitudinally and is undercut at its free end, and the other of said fingers has a thin terminal end which lies in a common plane with the split in said first-named finger.

5. A device for undercutting the mica of a commutator secured to an armature comprising means, including rollers, for rotatably supporting the shaft of said armature, an electric circuit, a pair of electrical conductive fingers in said electric circuit, and positioned so that one of said fingers of the pair contacts one segment of said commutator, while the other finger of the pair contacts a second segment of the commutator, whereby to close said circuit, and a cutting element for undercutting the mica between the segments of said commutator movably supported near said rollers, said cutting element having driving means responsive to the closing of said circuit.

6. A device for undercutting the mica of a commutator secured to an armature, comprising a cutter mounted for movement into and out of contact with the mica insulators between the segments of said commutator, electric means to drive said cutter, co-operating electrical circuits, there being a pair of electrical conductive fingers in one of said circuits, one finger of said pair being positioned whereby to contact one segment of said commutator and the second finger of said pair being positioned whereby to contact a second segment of said commutator, means to move said pair of fingers into and out of contact with said segments, whereby to open and close said last named circuit, said fingers being so spaced that said last named circuit is opened when one of said fingers contacts a mica insulator between two of said segments, and said last named circuit is closed when each of said fingers contacts a different segment of said commutator, said last named circuit when closed actuating said cutter drive means and at least one of said other circuits.

7. A device for controlling a circuit between a pair of conductive bars, having an insulator therebetween, comprising in combination, an electric circuit, a pair of conductive fingers in said circuit, one of said fingers having a section for contacting one of said bars in said pair, and another section for contacting the other bar in said pair, whereby to close said circuit, the other said finger having a thin edge located between the said portions of said first named finger, and arranged for contacting said insulator, whereby upon the contacting of said insulator said circuit is opened between said conductive bars.

References Cited in the file of this patent

UNITED STATES PATENTS

| | | |
|---|---|---|
| 381,228 | Fiske | Apr. 17, 1888 |
| 1,911,574 | Karle | May 30, 1933 |
| 2,405,773 | Barrett | Aug. 13, 1946 |